(12) United States Patent (10) Patent No.: US 7,734,578 B2
Prahlad et al. (45) Date of Patent: Jun. 8, 2010

(54) SYSTEM AND METHOD FOR PERFORMING INTEGRATED STORAGE OPERATIONS

(75) Inventors: Anand Prahlad, East Brunswick, NJ (US); David Ngo, Shrewsbury, NJ (US); Lixin Zhou, Winnipeg (CA); Andreas May, Marlboro, NJ (US)

(73) Assignee: Comm Vault Systems, Inc., Oceanport, NJ (US)

( * ) Notice: Subject to any disclaimer, the term of this patent is extended or adjusted under 35 U.S.C. 154(b) by 894 days.

(21) Appl. No.: 10/989,893

(22) Filed: Nov. 15, 2004

(65) Prior Publication Data

US 2006/0155712 A1 Jul. 13, 2006

Related U.S. Application Data

(60) Provisional application No. 60/519,540, filed on Nov. 13, 2003.

(51) Int. Cl.
*G06F 12/00* (2006.01)
*G06F 17/30* (2006.01)
*G06F 7/00* (2006.01)

(52) U.S. Cl. .................. 707/609; 707/705; 707/999.2; 707/999.001

(58) Field of Classification Search ................. 707/100, 707/200, 1
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |

(Continued)

FOREIGN PATENT DOCUMENTS

EP  0 259 912  3/1968

(Continued)

OTHER PUBLICATIONS

OpenAir.com, Product Update—Jun. 21, 2001, http://web.archive.org/web/20011007153900 1http:llwww.openair.comlhomeln_p_update062101 .html, Oct. 2001.*

(Continued)

*Primary Examiner*—Apu M Mofiz
*Assistant Examiner*—Jared M Bibbee
(74) *Attorney, Agent, or Firm*—Perkins Coie LLP (57) ABSTRACT

The present invention relates to a method for performing integrated storage operations on an information store. The present invention comprises identifying a plurality disparate types of storage operations stored in a policy option table. A first storage operation is performed according to a first set of storage criteria stored in the policy option table and a second operation, disparate from the first storage operation, is performed according to a second set of storage criteria stored in the policy option table.

13 Claims, 8 Drawing Sheets

U.S. PATENT DOCUMENTS

| | | | |
|---|---|---|---|
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 2001/0049779 A1 | 12/2001 | Shimada et al. |
| 2002/0004883 A1 | 1/2002 | Nguyen et al. |
| 2002/0099914 A1 | 7/2002 | Matsunami et al. |
| 2003/0033346 A1 | 2/2003 | Carlson et al. |
| 2003/0172130 A1* | 9/2003 | Fruchtman et al. .......... 709/219 |
| 2004/0044856 A1* | 3/2004 | Umbehocker et al. ....... 711/154 |
| 2004/0170374 A1* | 9/2004 | Bender et al. ................. 386/46 |
| 2004/0230566 A1* | 11/2004 | Balijepalli et al. ............. 707/3 |
| 2005/0033757 A1* | 2/2005 | Greenblatt et al. .......... 707/100 |
| 2005/0203864 A1* | 9/2005 | Schmidt et al. ................ 707/1 |
| 2007/0043773 A1* | 2/2007 | Tsuji .......................... 707/200 |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0838758 | 4/1998 |
| EP | 0 899 662 | 3/1999 |
| EP | 0 981 090 | 2/2000 |
| WO | 95/13580 | 5/1995 |
| WO | 99/12098 | 3/1999 |
| WO | WO-02-088943 | 11/2002 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and the recitation in claim 5).

PCT International Preliminary Report on Patentability for International Application No. PCT/US2004/038323, date of mailing Mar. 12, 2009, 8 pages.

PCT International Search Report and Written Opinion for International Application No. PCT/US2004/038323, date of mailing Feb. 19, 2008, 10 pages.

Veritas Software Corporation, "Veritas Volume Manager 3.2, Administrator's Guide," Aug. 2001, 360 pages.

* cited by examiner

Fig. 1 (Prior Art)

Fig. 2 policy option table

SYSTEM AND METHOD FOR PERFORMING INTEGRATED STORAGE OPERATIONS

Applicant(s) hereby claim the benefit of provisional patent application Ser. No. 60/519,540, entitled "SYSTEM AND METHOD FOR PERFORMING INTEGRATED STORAGE OPERATIONS," filed on Nov. 13, 2003. The application is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

RELATED APPLICATIONS

This application is related to the following patents and pending patent applications, each of which is hereby incorporated herein by reference in its entirety:

U.S. Pat. No. 6,418,478, entitled "PIPELINED HIGH SPEED DATA TRANSFER MECHANISM," issued Jul. 9, 2002;

Application Ser. No. 60/519,576, entitled "SYSTEM AND METHOD FOR PERFORMING AN IMAGE LEVEL SNAPSHOT AND FOR RESTORING PARTIAL VOLUME DATA," filed Nov. 13, 2003.

Application Ser. No. 09/610,738, entitled "MODULAR BACKUP AND RETRIEVAL SYSTEM USED IN CONJUNCTION WITH A STORAGE AREA NETWORK," filed Jul. 6, 2000;

Application Ser. No. 09/744,268, entitled "LOGICAL VIEW AND ACCESS TO PHYSICAL STORAGE IN MODULAR DATA AND STORAGE MANAGEMENT SYSTEM," filed Jan. 30, 2001;

Application Ser. No. 60/409,183, entitled "DYNAMIC STORAGE DEVICE POOLING IN A COMPUTER SYSTEM," filed Sep. 9, 2002;

Application Ser. No. 60/460,234, entitled "SYSTEM AND METHOD FOR PERFORMING STORAGE OPERATIONS IN A COMPUTER NETWORK," filed Apr. 3, 2003;

Application Ser. No. 60/519,876, entitled "SYSTEM AND METHOD FOR PERFORMING A SNAPSHOT AND FOR RESTORING DATA," filed Nov. 13, 2003; and Application Ser. No. 60/519,576, entitled "SYSTEM AND METHOD FOR PERFORMING AN IMAGE LEVEL SNAPSHOT AND FOR RESTORING PARTIAL VOLUME DATA," filed Nov. 13, 2003.

BACKGROUND OF THE INVENTION

The invention disclosed herein relates generally to performing integrated storage operations, including management of snapshots, backups and other storage operations performed on an information store. More particularly, the present invention relates to a system and method for combining different data snapshot and backup strategies for homogenous data protection according universal policies entered by a user or administrator.

To obtain a more thorough understanding of the present invention, the following discussion provides additional understanding regarding the manner is which information is typically stored on magnetic media. Using traditional techniques, backups of an information store are performed using the operating system's file system. Backup is done by accessing the operating system's (OS) file system for the information store to be backed-up, such as the Windows NTFS file system. The file allocation system of the operating system typically uses a file allocation table to keep track of the physical or logical clusters across which each file in the information store is stored. Also called an allocation unit, a cluster is a given number of disk sectors that are treated as a unit, each disk sector storing a number of bytes of data. This unit, the cluster, is the smallest unit of storage the operating system can manage. For example, on a computer running Microsoft's Windows 95 operating system, the OS uses the Windows FAT32 32-bit file allocation table having a cluster size to 4K. The number of sectors is determined when the disk is formatted by a formatting program, generally, but not necessarily, when the OS is installed.

The operating system allocates disk space for a file only when needed. That is, the data space is not preallocated but allocated dynamically. The space is allocated one cluster at a time, where a cluster is a given number of consecutive disk sectors. The clusters for a file are chained together, and kept track of, by entries in a file allocation table (FAT).

The clusters are arranged on the disk to minimize the disk head movement. For example, all of the space on a track is allocated before moving on to the next track. This is accomplished by using the sequential sectors on the lowest-numbered cylinder of the lowest numbered platter, then all sectors in the cylinder on the next platter, and so on, until all sectors on all platters of the cylinder are used. This is performed sequentially across the entire disk, for example, the next sector to be used will be sector 1 on platter 0 of the next cylinder.

For a hard (fixed) disk, FAT, sector, cluster, etc. size is determined when a disk formatting program formats the disk, and are based on the size of the partition. To locate all of the data that is associated with a particular file stored on a hard disk, the starting cluster of the file is obtained from the directory entry, then the FAT is referenced to locate the next cluster associated with the file. Essentially, the FAT is a linked list of pointers to clusters on the disk, e.g., each 16-bit FAT entry for a file points to the next sequential cluster used for that file. The last entry for a file in the FAT has a number indicating that no more clusters follow. This number can be from FFF8 to FFFF (base 16) inclusive.

Figure 1:
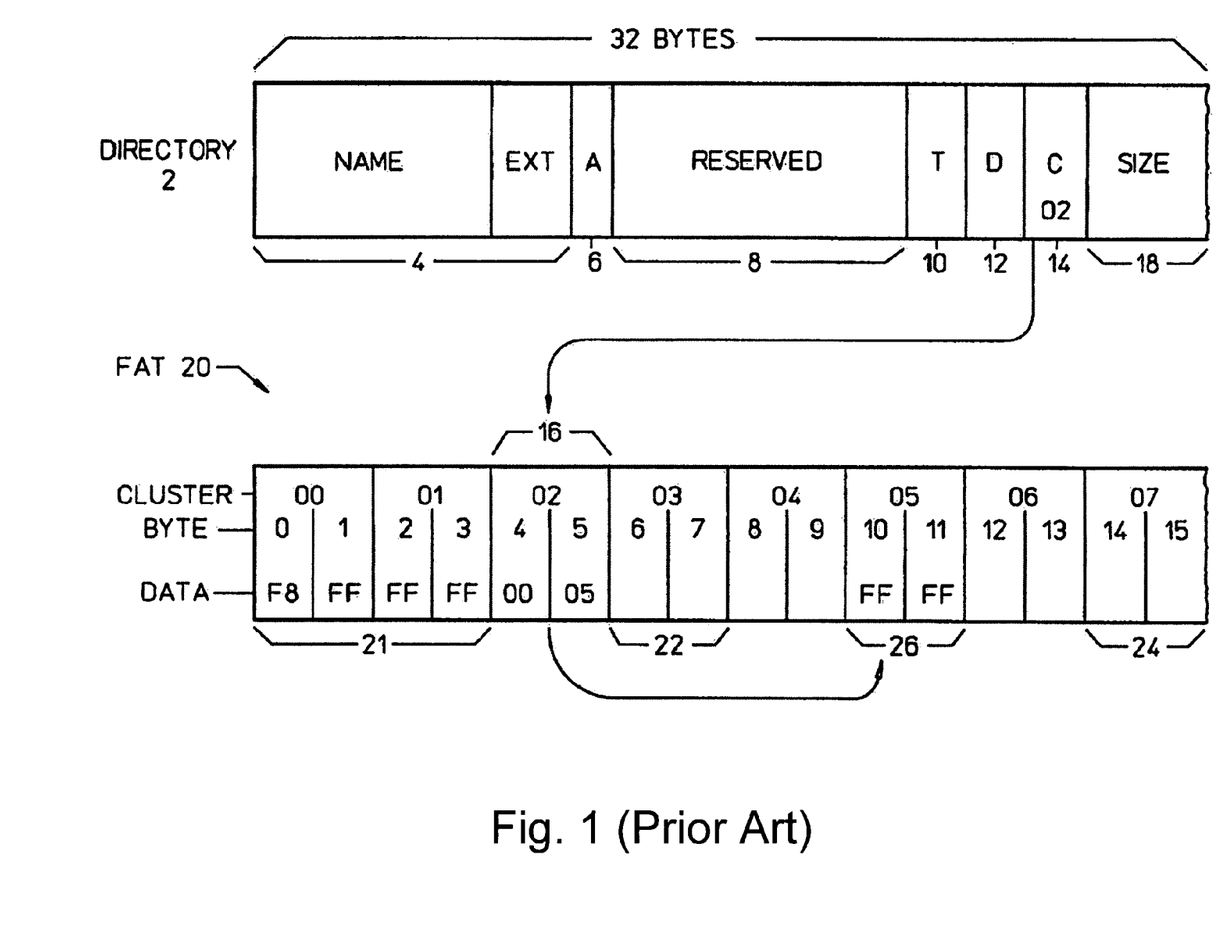
FIG. 1 is an example directory entry for a file in a prior art FAT table of a Windows-formatted hard disk.

FIG. 1 shows an example directory entry 2 of a Windows-formatted hard disk and accompanying FAT 20. The exemplary directory entry 2 consists of 32 bytes of data. The name of the file and its extension are stored in the first eleven bytes 4 of the directory entry 2 and a file attribute byte 6 is provided. By definition, ten bytes 8 are reserved for future use and four bytes are provided to store time 10 and date 12 information (two bytes each). Two cluster bytes 14 point to the first cluster of sectors used to store the file information. The last four bytes 18 of the directory entry 2 are used to store the size of the file.

A sixteen-byte section of a FAT 20 is depicted. The first four bytes 21 store system information. A two-byte pair, bytes four and five (16), are the beginning bytes of the FAT 20 used to track file information. The first cluster for data space on all disks is cluster "02." Therefore, bytes four and five (16) are associated with the first cluster of disk sectors "02" used to store file information. Bytes six and seven (22) are associated with cluster "03" . . . and bytes fourteen and fifteen (24) are associated with cluster "07."

This example illustrates how sectors associated with a file referenced in a directory are located. The cluster information bytes 14 in the directory 2 point to cluster number "02." The sectors in cluster "02" (not shown), contain the initial sector of data for the referenced file. Next, the FAT is referenced to see if additional clusters are used to store the file information. FAT bytes four and five (16) were pointed to by the cluster information bytes 14, and the information stored in bytes four and five (16) in the FAT 20 point to the next cluster used for the file. Here, the next cluster is "05". Accordingly, cluster "05" contains the next sector of data for the referenced file. FAT bytes ten and eleven (26) contain an end-of-file flag, "FFFF," indicating there are no more clusters associated with the referenced file. All of the information comprising the referenced file, therefore, is contained in clusters "02" and "05" on the disk.

As with other applications running on the computer, a typical copy application provides a read request to the operating system, which handles interpretation of the information contained in the FAT and reading of each file for the copy application. A file system is provided on the destination storage device that is used by the copy application to write files. Similarly, the recovery portion of the copy application, or a separate recovery application, may read files from the destination storage device for recovery of the information.

One currently available alternative is to perform snapshots of an information store. With current snapshot systems and methods, administrators create an incremental copy that is an exact point-in-time replica of the source volume each time a snapshot is taken. The snapshot is stored locally on the information store from which it was taken and tracks incremental changes to the data in the information store. Furthermore, changed data is written to a new location in the information store as tracked by the snapshot. With knowledge regarding the change, as well as the changed data, the snapshot can be used to "roll back" changes to an information store to the point in time when the snapshot was taken. If there should be any logical corruption in the information store's data that went un-detected for a period of time, however, these incremental updates faithfully replicate that logical corruption to the data when copying. Additionally, other drawbacks are associated with currently known snapshot techniques, including the significant drawback of preventing restoration from the snapshot in the event that the information store fails, as both the snapshot and the information store become unavailable.

Another technique known in the art is serverless or extended copy. Extended copy systems utilize intelligent devices to perform copying of an information store, e.g., a disk array attached to a database server. These systems conduct copying without requiring the use of a copy server or the server whose data is being copied to move a data stream from source volume to a storage device, such as a tape drive. The intelligent device is typically a data router (SCSI to Fibre Channel bridge), or other network infrastructure device, that is in communication with an information store or other storage devices, e.g., in a storage area network ("SAN"). Recently, a set of extended copy commands have been incorporated into storage devices themselves, which are connected to the SAN. In this case, the server tells the storage device which data in an information store to copy and the storage device then moves the data directly from the information store to the storage device. Since there is no server involved in transporting the data stream, this copy method is known as serverless.

Over time, an organization may employ different combinations of techniques known in the art to perform backups, snapshots and other copying of information stores. Unfortunately, none of these techniques, or the systems that implement them, are compatible, which heretofore disallows using universal policies to leverage multiple techniques known to the art in a unified fashion. The problem of not having a universal backup or snapshot policy becomes especially pronounced when applied to a multiple-host environment; for example, several hosts coupled to a storage area network (SAN). In these environments, for example, it would be advantageous to periodically perform a full copy of a information store, which organizes the copy by file names and folders, and includes the capability to restore individual data file names and folders. Yet, it is also advantageous to perform periodic snapshots of an information store, where each snapshot is an index of the data contained on an information store at the point in time when the snapshot was taken.

The incompatibility of current systems causes significant difficulty in host network administration. For example, if a host administrator wishes to restore a full copy or snapshot of an information store, the correct software must be loaded, and a copy or snapshot created at some point in time must be selected for restoring. In the case of restoring a full copy, selected files may be restored. In the case of a snapshot, the administrator is typically limited to restoring a whole snapshot. If, for example, recovery of backup files or a snapshot is desired because of a discovered problem with a volume, the selected copy or snapshot should be one that was created before the problem occurred. Even after finding a seemingly correct copy or snapshot to restore, however, it is quite possible that a different snapshot or copy system created a copy or snapshot that was performed even later in time, but before the problem occurred, which would be more desirable to restore. Nevertheless, the administrator has no way to determine if this is the case.

Related to this problem, currently incompatible backup systems do not leverage off each others' capabilities. For example a snapshot cannot be leveraged to perform typical operations performed using a full copy, including file or folder level restoration. Even limiting to just using snapshots, those created by different software systems may not even be compatible, and therefore, one type of snapshot system cannot leverage the capabilities of the other.

Thus, there is a need for systems and methods employing policies to determine the time and order in which one or more storage operations are performed on one or more data stores.

SUMMARY OF THE INVENTION

The present invention addresses, among other things, the problems discussed above with creating copies up data using current and past systems that do not provide consistent and centralized storage policies, nor compatibility between these disparate techniques.

In accordance with the present invention, a data protection agent is provided for performing snapshots, full copies and other storage operations on information stores communicating over a network. A proxy host may execute the data protection agent that, in connection with one more ore media agents, performs storage operations on information stores across the network. As an alternative to using a proxy host, the data protection agent may be stored and executed on an intelligent device on the network, such as a router or other network infrastructure device, or another node on the network.

According to one embodiment, the data protection agent manages and controls different types of storage operations according to diverse formats, which are otherwise incompatible. The data protection agent executes, e.g., a copy or snapshot of the information store, and processing of the copy or snapshot is performed on the proxy host computer or intelligent device to relieve the target host of processor usage. Further processing is then performed, whether the processing requires the snapshot to merely be stored in a storage device, or requires that a full copy operation be performed, including utilizing the FAT table of the target volume to create a snapshot or full copy that can be browsed down to the file and folder level, also known as an image level copy.

Processing may also include converting metadata describing the snapshots and copies into a normalized format so an easy facility may be provided for an administrator to restore the data generated by the disparate storage operations.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 2:
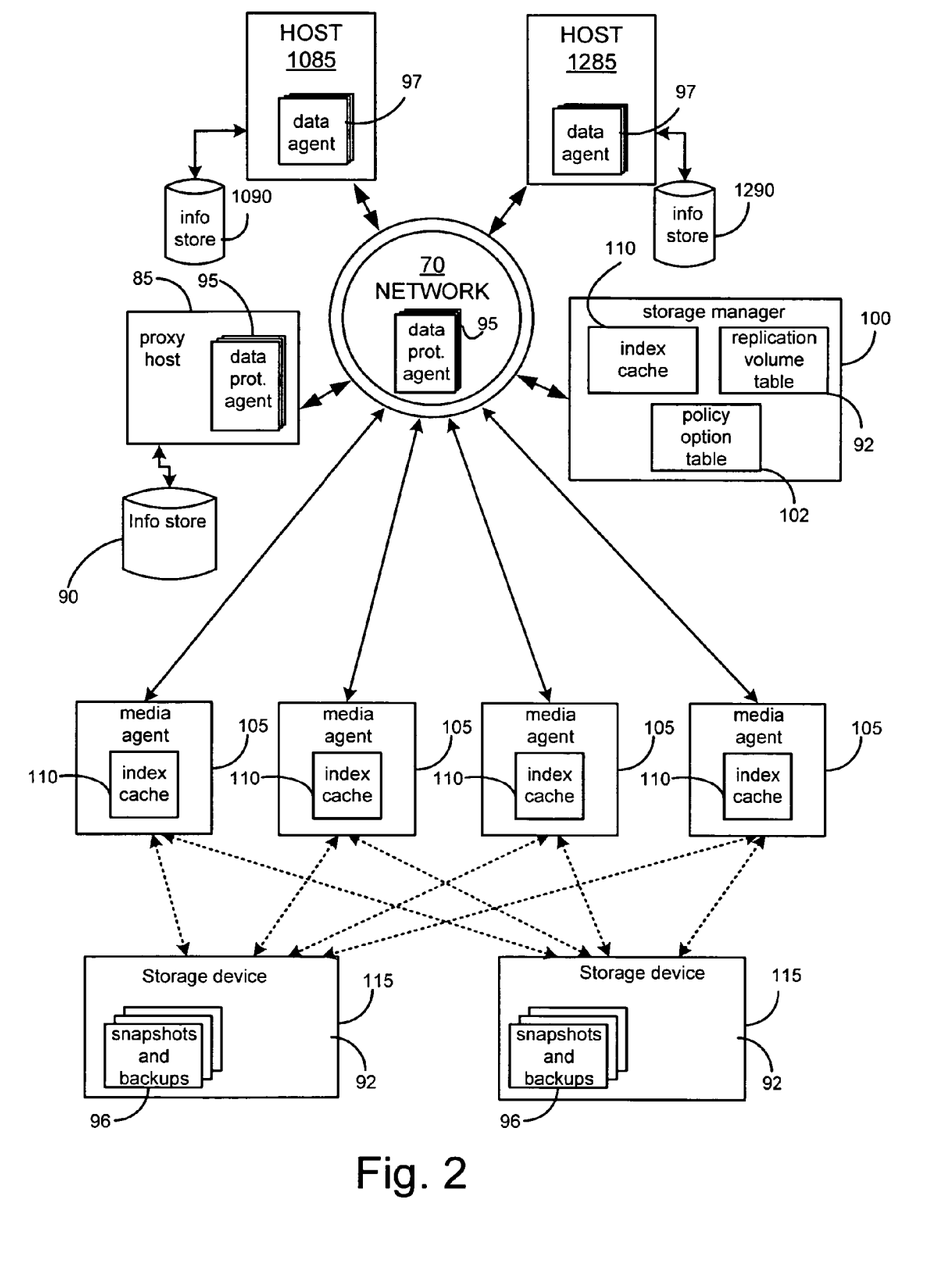
FIG. 2 is a block diagram illustrating a network architecture for performing snapshot and backup operations according to one embodiment of the present invention.

With reference to FIGS. 2 through 8, embodiments of the invention are presented. FIG. 2 presents a block diagram illustrating one embodiment of a network of host computers 85, 1085, 1185 and 1285 connected by a network 70, which may comprise, for example, a storage area network (SAN) or a packetized local or wide area network, and a system for performing storage operations on data, which may include the use of storage policies.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to archive media as metadata for use in restore operations or other storage operations, or to other locations or components of the system. Storage operations, as contemplated by the present invention, include any operation where data is transferred from one volume or device to another, such as, but not limited to, backups, snapshots, clones, etc.

Each host computers 85, 1085, 1185 and 1285 is in communication with an information store, 90, 1090, 1190 and 1290 respectively, each of which stores data for client computers (not shown). One of the host computers, a proxy host 85, contains a data protection agent 95, which is a software module that is generally responsible for coordinating the actions of one or more data agents 97 for fully copying, performing snapshots, archiving, migrating, and recovering data in the information stores 1090, 1190 and 1290 of each of the one or more of the other host computers 1085, 1185 and 1285. According to one embodiment, the data protection agent 95 is operative to perform all the functions provided by the one or more data agents 97.

The proxy host 85 may be used to create proxy copies of an information store 90, 1090, 1290. Typically, when making a copy of an information store, the host 1085, 1285 works with a media agent 105 to copy data from an information store 1090, 12090 to a storage device. In the process, the media agent 105 updates its index 110 to indicate the given information store 1090, 1290 from which the copy was made. Unfortunately, the resources of the host 1085, 1285 are utilized in the process. Using a proxy host 85, processing is offloaded to the proxy, which performs the functions of the host 1085, 1285, working with a media agent 105 to write the data from an information store 1090, 1290 to a storage device 115. The proxy 85 also supplies metadata for storage in the media agent's index 110 indicating the information store 1090, 1290 from which the copy was made. Alternatively, a data protection agent running in the storage manager may act as the proxy host, eliminating the need for a separate proxy host for this operation. In embodiments wherein the storage manager has enough memory and processing power to act as the proxy host, the data protection agent runs on the storage manager, and the media agents store the file of clusters directly to a storage device.

Advantageously, the present invention may be used to create snapshots from backups that have been created using techniques known to those of skill in the art. A backup is taken of an information store, which is subsequently restored on a storage device that is located remotely from the information store, e.g., a proxy host. A snapshot is taken of the restored backup, and metadata is used to record that the snapshot was taken from the information store from which the backup was taken, not the restored backup.

Each of the host computers 1085, 1185 and 1285 may contain a local data agent 97 which may perform copy operations on an information store 1090, 1190 and 1290. Each data agent 97 has the capability of performing local low-level read and write calls at least the cluster level under the control of the data protection agent 95. It should be noted that clusters are but one level of granularity by which the data agent 97 may interact with an information store, e.g., blocks, extents, etc. The operations performed by the data protection agent 95, however, may be carried out without the a data agent 97 present in each host computer 1085, 1185 and 1285 by providing the data protection agent 95 with access to system level commands on the local hardware or operating systems of the host computers 1085, 1185 and 1285.

As shown, the system of FIG. 2 also includes a storage manager 100, including a volume replication table 102 and a storage manager index cache 120, and one or more of the following: a client 85, an information store 90, a data agent 95, a media agent 105, a media agent index cache 110, and a storage device 115. One exemplary embodiment of the present system is the CommVault QuNetix three-tier system available from CommVault Systems, Inc. of Oceanport, N.J., further described in U.S. patent application Ser. No. 09/610,738 and hereby incorporated by reference in its entirety.

These components may either reside within or at the same location as the proxy host 85, or may be connected through the network 70, as long as a data path is provided between the storage manager and the data protection agent 95 so that they may work together in instructing the data 97 and media 105 agents regarding the manner in which to store data in the storage devices 115. Alternatively, the data protection agent 95 may be included in the storage manager 100, providing commands to the proxy host, data and media agents 85 to control storage operations on information stores 90, 1090 and 1290. In some embodiments, the system has two or more data protection agents 95, one each at various locations in the system, working separately, or in cooperation with each other.

The data protection agent 95 provides a single interface for specifying specific data to copy or take a snapshot of, and allows a user or administrator to define a work-flow for after a snapshot or backup is created. For example, the user can choose to schedule a snapshot, described below, to run three times a day and only on the second attempt, choose to perform a full copy of all data in an information store. Similarly, the user can choose to schedule full copies of information stores, once every day of the week, but just on Sunday. Further, the data protection agent can be configured to perform a local area network volume copy command (LANVolCopy), hardware-based serverless data movement or software based serverless data movement to copy the data to create the point-in-time copy.

The storage manager 100 is generally a software module or application that helps coordinate and control storage of backups and snapshots into storage devices 115. The storage manager 100 communicates with the proxy host 85, data agents 95, media agents 105, and storage devices 115, to control full copies, snapshots, migrations, recoveries, etc. 96.

The storage manager 100 maintains a storage manager index cache 120. Data in the storage manager index cache 120, which the storage manager 100 collects from data agents 95, media agents 105, user and other applications, is used to indicate, track and associate: logical relationships and associations between components of the system, user preferences, management tasks, and other data that is useful to the system. For example, the storage manager index cache 120 may contain data that tracks logical associations between media agents 105 and storage devices 115. The storage manager index cache 120 may also contain data that tracks the status of storage operations to be performed, storage patterns such as media use, storage space growth, network bandwidth, service level agreement ("SLA") compliance levels, data protection levels, storage policy information, storage criteria associated with user preferences, data retention criteria, storage operation preferences, and other storage-related information.

In order to track of the multiple snapshots, the data protection agent 95 uses a database table or other data structure or file map referred to as a replication volume table 92, which is stored in the proxy host information store 90. Alternatively, in the case where a special proxy host 85 is not used, the replication volume table 92 is stored in a storage device 115.

The replication volume table 102, among other advantages, facilitates the tracking the results of multiple storage operations across multiple storage devices 115. For example, the system might, as directed by a policy or a user, store a first snapshot on first storage device A, such as a tape drive or library, and then store subsequent snapshots containing only the changed culster(s), $t_n$, on a second storage device B, such as an optical drive or library. Alternatively, instructions may be stored within system components, e.g., a storage manger 100 or media agent 105, directing the storage devices 115 used to store snapshots. Information regarding the storage device 115 to which the snapshot is written, as well as other information regarding the snapshot generally, is written to the replication volume table 102. An exemplary structure according to one embodiment is as follows:

```
(
    id                  serial,      //  PRIMARY KEY FOR THIS
                                         TABLE
    PointInTime         integer,     //
    CreationTime        integer,     //  Timestamp of RV creation
    ModifyTime          integer,     //  Timestamp of last RV update
    CurrentState        integer,     //  Current state of RV
    CurrentRole         integer,     //  Current role of RV
    PrimaryVolumeId     integer,     //  FOREIGN KEY FOR
                                         SNRVolume TABLE
    PhysicalVolumeId    integer,     //  FOREIGN KEY FOR
                                         SNRVolume TABLE
    ReplicationPolicyId integer,     //  FOREIGN KEY FOR
                                         ReplicationPolicy TABLE
    RVScratchVolumeId   integer,     //  FOREIGN KEY FOR
                                         RVScratchVolume table
    Flags               integer,
    JobId               LONGLONG,
    SnapVolumeId        integer,     //  FOREIGN KEY FOR
                                         SNRVolume TABLE
}
```

In the exemplary replication volume table, id is a unique identification number assigned by the system to the snapshot; PointInTime represents the date and time that the snapshot was created; CreationTime represents the date and time that the snapshot was completed; ModifyTime is the recorded date and time of the snapshot taken prior to the current snapshot; CurrentState is an identifier used to indicate a current status of the snapshot (e.g. pending, completed, unfinished, etc.); PrimaryVolumeId is the identifier for the information store 90 from which the snapshot is being made; PhysicalVolumeId is a hardware identifier for the information store 90; RVScratchVolumeId is an identifier for a scratch volume, which in some embodiments may be used to buffer additional memory as known to those of skill in the art; Flags contains a 32 bit word for various settings such as whether a snapshot has been taken previously, etc.; JobId stores the identifier for the job as assigned by a storage management module; and the SnapVolumeId points to the physical destination storage device 115 to which the snapshot is written.

As each snapshot indexes the changes to an information store at a given point in time, a mechanism must be provided that allows the snapshots taken of an information store to be chronologically related so that they are properly used for restoring an information store 90. According to the replication volume table 102, the CurrentRole integer may store a value for the relative position of a given snapshot in hierarchy of snapshots taken from a given information store 90 (e.g. first (t0), second (t1), t2, t3, etc.)

A media agent 105 is a software module that transfers data in conjunction with one or more data agents 95, as directed by the storage manager 100, between an information store 90 and one or more storage devices 115, such as a tape library, a magnetic media storage device, an optical media storage device, or other storage device. The media agent 105 communicates with and controls the one or more storage devices 115. According to one embodiment, the media agent 105 may communicate with the storage device 115 via a local bus, such as a SCSI adaptor. Alternatively, the storage device 115 may communicate with the media agent 105 via a Storage Area Network ("SAN"). Other types of communication techniques, protocols and media are contemplated as falling within the scope of the invention.

By way of example, the media agent 105 receives snapshots, preferably with the changed data that is tracked by the snapshot, from one or more data agents 95 and determines one or more storage devices 115 to which it should write the snapshot. According to one embodiment, the media agent 105 applies load-balancing algorithms to select a storage device 115 to which it writes the snapshot. Alternatively, the storage manager 100 instructs the media agent 105 as to which storage device 115 the snapshot should be written. In this manner, snapshots from a given information store 90 may be written to one or more storage devices 115, ensuring data is available for restoration purposes in the event that the information store fails. Either the media agent or the storage manager 100 records the storage device on which the snapshot is written in a replication volume table 102, thereby allowing the snapshot to be located when required for restoring the information store 90.

A media agent 105 maintains a media agent index cache 110 that stores index data the system generates during snapshot, migration, and restore operations. For example, storage operations for Microsoft Exchange data generate application specific index data regarding the substantive Exchange data. Similarly, other applications may be capable of generating application specific data during a copy or snapshot. This data is generally described as metadata, and may be stored in the media agent index cache 110. The media agent index cache 110 may track data that includes, for example, information regarding the location of stored data on a given volume. The media agent index cache 110 may also track data that includes, but is not limited to, file names, sizes, creation dates, formats, application types, and other file-related information, information regarding one or more clients associated stored data, information regarding one or more storage policies, storage criteria, storage preferences, compression information, retention-related information, encryption related information, and stream related information. Index data provides the system with an efficient mechanism for locating user files during storage operations such as copying, performing snapshots and recovery.

In some embodiments, components of the system may reside on and be executed by a single computer. According to this embodiment, a data agent 95, media agent 105 and storage manager 100 are located at the client computer 85 to coordinate and direct local copying, archiving, migration, and retrieval application functions among one or more storage devices 115 that are remote or distinct from the information store 90. This embodiment is further described in U.S. patent application Ser. No. 09/610,738.

Figure 3:
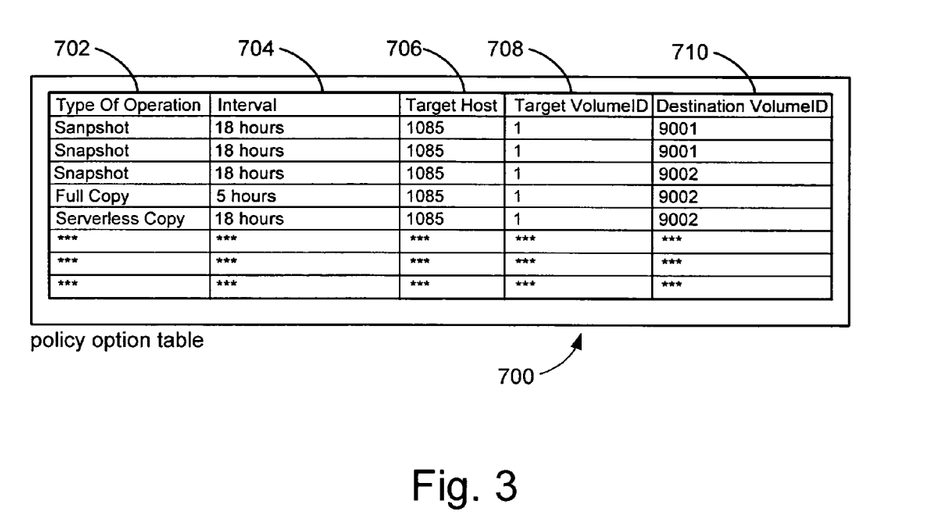
FIG. 3 is a block diagram of a policy option table for storing instructions regarding backup and snapshot operations according to one embodiment of the present invention.

FIG. 3 illustrates a policy option table 700 that provides policies for storing instructions or policies regarding the execution of storage operations, copying and snapshots, on data contained in information stores attached to the network. In one embodiment, the policy option table is embodied as a storage policy. Alternatively, one or more entries in the policy option table comprise a storage policy. The policy option table 700 is used to instruct the data protection agent as to the sequence of operations that are to be carried out. Each record in the table 700 stores an operation to be carried out and identifies the type of operation 702. Exemplary entries in the table 700 include snapshots, a full copy, and a serverless copy. The table also maintains a time interval 704 over which the data protection agent should wait after the start of a given operation 702 before starting the next operation. A target host field 706 contains the host ID, or network ID, or other identifier of the host for which the operation 702 is to be carried out. A target volume ID field 708 contains the volume ID of a volume of the host 706 for which the operation 702 is to be performed. A destination volume ID field 710 contains an identification of a destination volume where the results (e.g. snapshot) of the operation 702 are stored.

When employing a policy option table, such as the exemplary embodiment presented in FIG. 3, the data protection agent, in conjunction with one or more data and media agents, performs the operation 702 designated in the table 700, to the target host identified in field 706 and target volume 708, and stores the results in the destination volume identified in field 710. After the specified time interval 704, the subsequent operation 702 is performed. This provides for simplicity of policy design and entry of options by the administrator. In other embodiments, however, other more complex options may be available and stored in the table 700. For example, contingencies may be added in which operations are directed to cease for a specific target host if an error encountered during processing a previous operation on the same target host. If the contingency arises, the storage manager may send a page or message to a system administrator's communication device, who may diagnose the problem and re-start operations for the target host.

Figure 4:
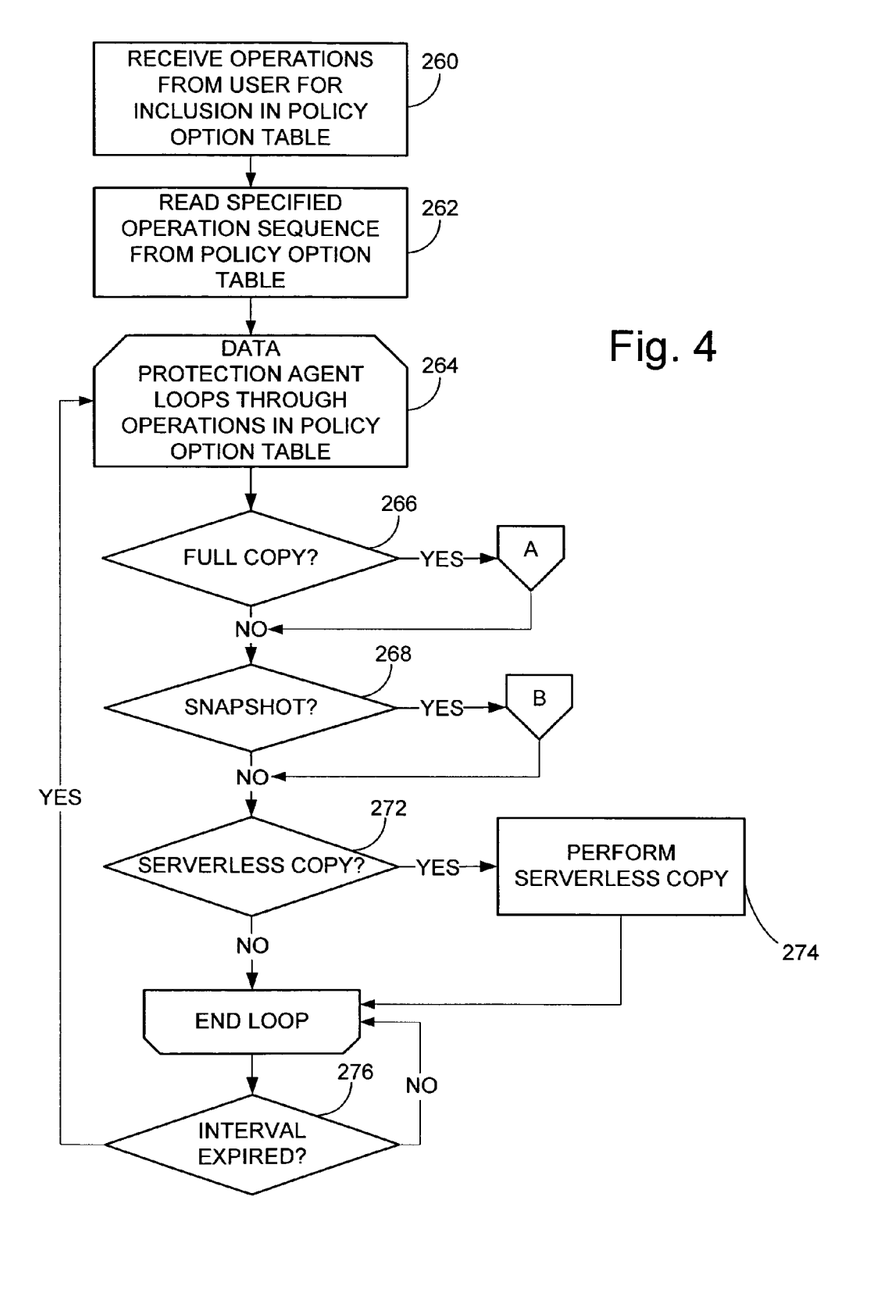
FIG. 4 is a flow diagram illustrating a method for performing backup and snapshot operations according to one embodiment of the present invention.

One embodiment of a method for using the policy option table for executing copy operations on an information store is illustrated in the flow diagram of FIG. 4. When the data protection agent is initialized, options are received form a user, e.g., system administrator, regarding the operations that are to be performed, step 260. The policy option table may be used to store the sequence of operations to be carried out. Defining a policy a, such as a storage policy, to perform one or more different storage operations is referred to herein as an integrated storage operation.

To simplify the explanation of the present embodiment, FIG. 4 illustrates the steps performed by the proxy host or data protection agent with respect to information store. Those skilled in the art, however, should recognize that the steps performed by the data protection agent may be used to perform full copy, snapshot and other storage operations with regard to multiple remote information stores over a network, and to store the resultant information in multiple destinations according to, for example, a destination volume identifier that may be contained in the policy option table. Furthermore, the storage manager may control multiple data protection agents over the network so that the increased processing power may be utilized to perform the instructed operations, with each data protection manager having slave data protection agents or data agents. Finally, it should be noted that full copy operations beyond those presented in the present embodiment of the method are contemplated as falling within the scope of the invention.

Turning to step 260, the data protection agent may execute a configuration menu through an interface, e.g., a Graphical User Interface ("GUI") or an Application Programming Interface ("API"), to create or edit a given policy option table. Options such as a time interval between operations, or, in some embodiments, specific dates and times to perform the operations, may be entered. The sequence of the operations and other options may be stored in the policy option table.

After configuration, step 260, the data protection agent reads the policy option table, including the specified sequence of operations, step 262. The data protection agent initiates a loop to perform the sequence of specified operations, step 264. At each point in time specified in the policy option table, or after a specified time interval since the completion of the prior operation, the data protection agent determines what type of operation is called for by referring to the policy option table.

According to the present embodiment, if a full copy of all data in an information store t is to be performed, step 266, then the data protection agent sends the proper commands to a given data agent to perform the full copy of the specified information store on a specified host computer. Similarly, where the policy option table indicates that a snapshot, step 268, or a serverless copy is to be performed, step 272, processing is released to the proper subroutine, e.g., serverless copy subroutine, step 274, to execute the operation identified in the policy option table. After a given operation is performed, steps 266, 268, 272, the routine performs a wait operation, step 276, until the interval provided by the policy option table expires. At this point, processing returns to the start of the loop, step 264, where the next operation in the policy option table is executed.

Figure 5:
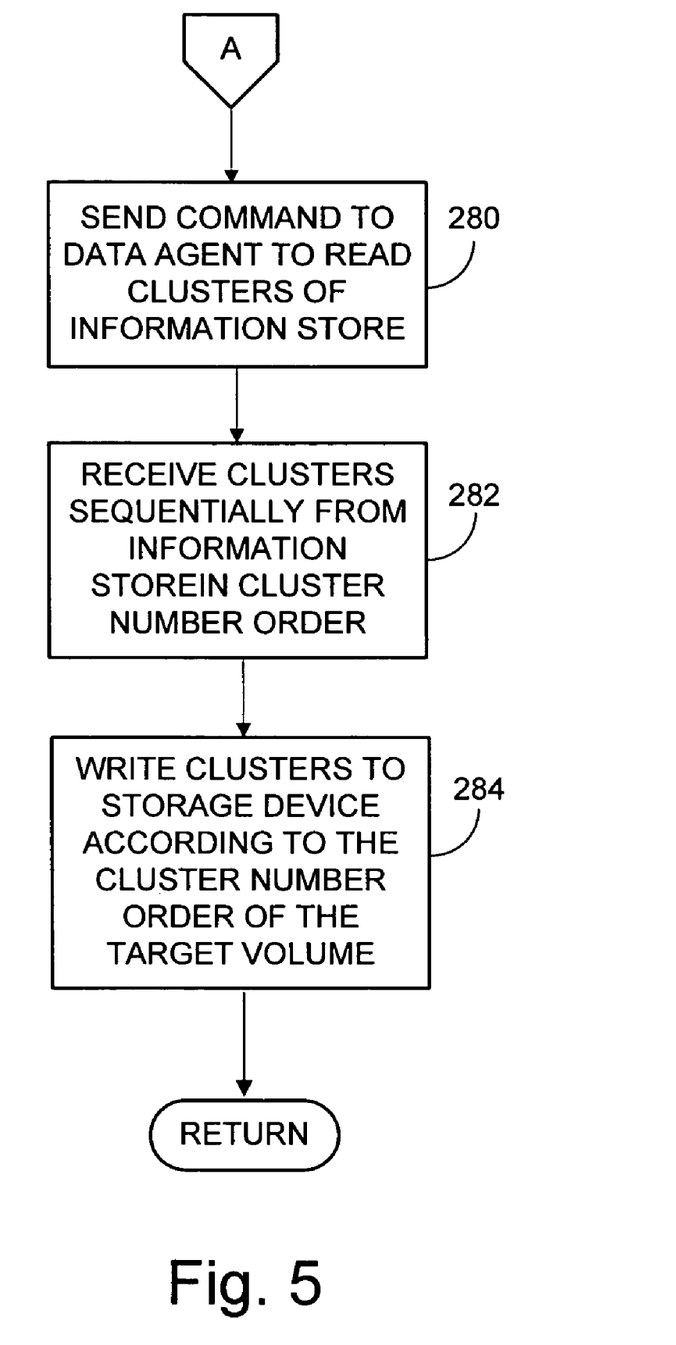
FIG. 5 is a flow diagram illustrating a method for performing a snapshot of a volume according to one embodiment of the present invention.

FIG. 5 presents a flow diagram illustrating one embodiment of a method for performing a full copy of an information store. A data protection agent, which may run on a proxy host, sends a command to a data agent running on a target host to read every cluster of the target volume, step 280. The clusters are read sequentially from the volume and transmitted to a given media agent, step 282, which stores the clusters in a storage device. The clusters are written to the storage device in the same order in which they were stored on the information store, step 284. As a safety measure, the data agent may further provide a cluster number with each transmitted cluster so that a double check may be performed on the order of the clusters. After being written to a storage device, the storage manager may update the replication volume table to reflect the new location where the data is located.

In another embodiment, the data protection agent is implemented to run on a network router or other network infrastructure device. Those skilled in the art should recognize that it is become more commonplace to run utilities from a network router, including in serverless copy operations. In embodiments of the present invention in which the data protection agent resides in a router on the network, the data protection agent communicates with the storage manager, which is run from a host in communication with the network.

After processing the snapshot, processing returns to FIG. 4, step 268. If the next operation in the policy option table is a snapshot, processing moves to the subroutine of FIG. 6, which presents a flow diagram illustrating the steps performed during a snapshot according to one embodiment of the present invention. First, a check is performed to determine if the present snapshot is an initial snapshot taken of an information store, step 300. If step 300 evaluates to true, the data agent to perform an initial full snapshot of the data stored in the information store, e.g., indexing the location of all data in the information store, in conjunction with one or more media agents and copies all of the data on the information store with the initial snapshot to a storage device, step 302.

Figure 6:
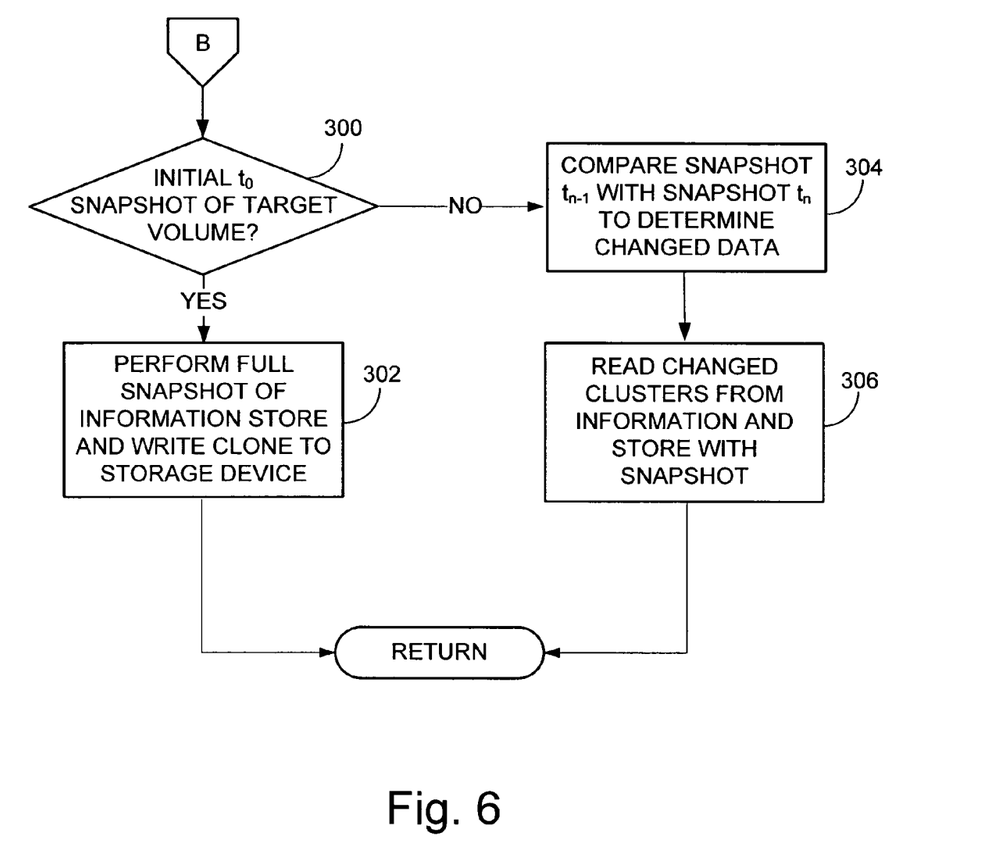
FIG. 6 is a flow diagram illustrating a method for performing a cluster level indexed snapshot according to one embodiment of the present invention.

Advantageously, the snapshot and data copied from the information store may be written to a storage device that is remote or different from the information store, step 302, e.g., local data from a given workstation written to a storage array attached to a network. The selection of a destination storage device for the snapshot may be accomplished using one or more techniques known to those of skill in the art. For example, a fixed mapping may be provided indicating a storage device for which all snapshots and copied or changed data should be written. Alternatively, an algorithm may be implemented to dynamically select a storage device from among a number of storage devices available on a network. For example, a storage manager may select a media agent to handle the transfer of the snapshot and copied data to a specific storage device based on criteria such as available bandwidth, other scheduled storage operations, media availability, storage policies, storage preferences, or other consider considerations. According to certain embodiments, the snapshot contains information regarding the files and folders that are tracked by the snapshot.

If the present snapshot, referred to as snapshot $t_n$, is not the initial snapshot, called snapshot to herein, step 300, then the data protection agent takes a snapshot of the information store and a comparison is performed such that only the clusters which have changed or been created since the last snapshot, $t_{n-1}$, was taken of that information store are copied, step 304. For example, in some embodiments the data agent employs a block filter or similar construct known to those of skill in the art to compare snapshot $t_n$ with $t_{n-1}$ and thereby detect changed clusters on an information store. Alternatively, the data agent may use other techniques know in the art, such as Copy on Write ("COW"), to identify changed data on an information store. If a given cluster in the information store has changed since the last snapshot in which the cluster appears, or if the cluster from the information store was created subsequent to the last snapshot, then the cluster is read from information store and stored with the new snapshot being written to the storage device, step 306.

Figure 7:
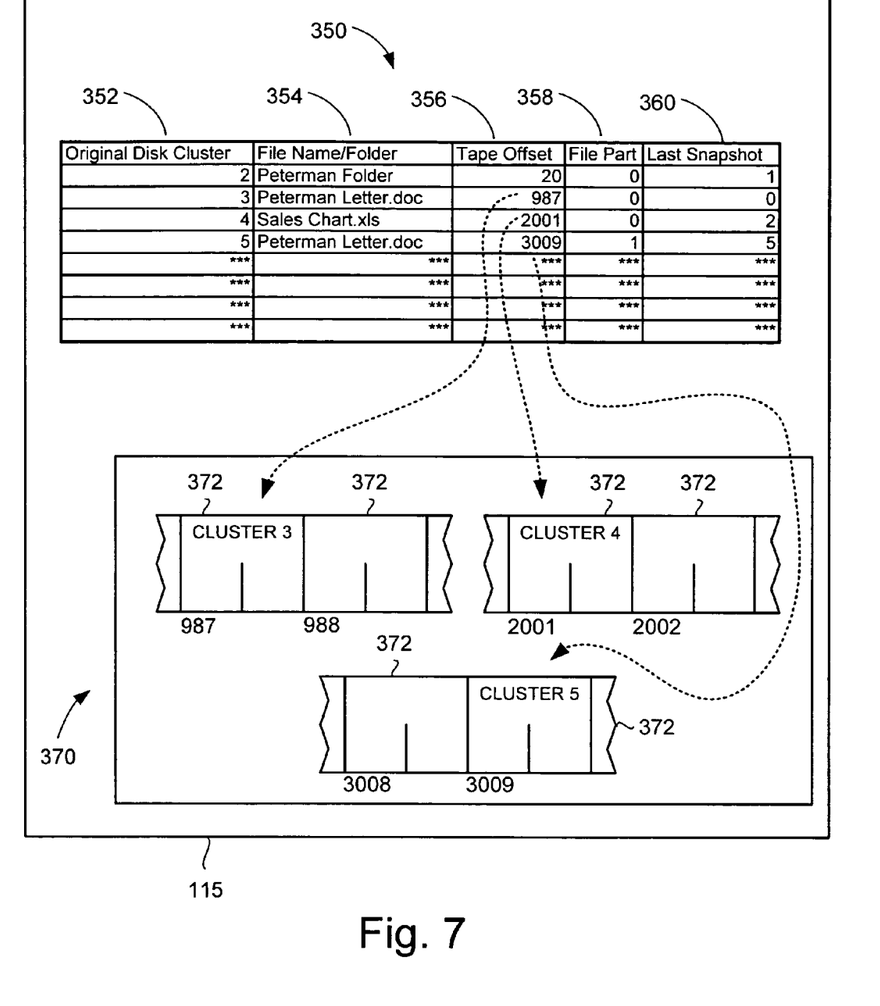
FIG. 7 is a block diagram illustrating the relationship between a map and a snapshot according to one embodiment of the present invention.

One embodiment of a snapshot used to track clusters read from the information store to clusters in a snapshot, as well as to map file and folder names corresponding to the snapshot clusters, is illustrated in FIG. 7. During the scan, the data agent creates a snapshot 350 and writes data, e.g., new or changed data, to a storage device 115. According to the present embodiment, the snapshot is illustrated as a flat file data structure, although those of skill in the art will recognize that the snapshot may be embodied in a number of disparate types of data structures.

The snapshot 350 is used to associate the original cluster numbers from an information store with clusters on a storage device, which in the present embodiment is a magnetic tape. It should be appreciated by those of skill in the art that the present invention is not limited to magnetic tape, and that the systems and methods described herein may be applicable to using snapshots with other storage technologies, e.g., storing disk geometry data to identify the location of a cluster on a storage device, such as a hard disk drive.

The tape offsets 356 for the clusters 372 in the snapshot 370 are mapped to original disk cluster information 352. File and folder names 354 may be scanned from the information store's FAT and also mapped to the tape offsets 356. A file part column 358 in the snapshot tracks the clusters 372 for each file and folder where each file and folder contains an entry for the first cluster 372. For files or folders that are stored in more than one cluster, sometimes not in contiguous clusters, the offset table entry for each further cluster is numbered consecutively 358.

In order to identify the files and folders represented by the stored clusters 372, e.g., changed data, in the snapshot 370, the map may exclude data from columns relating to the original disc clusters 352 and last snapshot 360. In order to keep track of changed verses unchanged clusters, however, the original disk cluster information 352 is stored in the map 350. Other information may also be stored in the map 350, such as timestamps for last edit and creation dates of the files.

For each snapshot, even though only clusters that have been changed or created since a previous snapshot are tracked in a given snapshot after the initial snapshot to, the snapshot may be provided with the data from all previous snapshots to provide the latest snapshot with folder and file information such that a picture of the entire information store is maintained concurrently each snapshot. Alternatively, this may be bypassed in favor of creating a snapshot that indexes all data at a given point in time in the information store and copying only changed data.

Entries from each snapshot 350 may also contain a last-snapshot field 360 that holds an identifier for the last snapshot containing the cluster indexed by the entry at the time the current snapshot was created. According to an alternative embodiment, e.g., for snapshots that do not store the information from the information store's FAT, the snapshot only tracks clusters stored in the information store with the clusters indexed by the snapshot. For those embodiments, the snapshot 350 contains neither file and folder information 345 nor file part information 358.

One advantage of using the data protection agent 95 to manage snapshots and backups of the multiple hosts is the ability to consolidate metadata regarding the various different kinds of snapshots, backups, and other copies made by various storage operations into a unified view of the storage operations performed on a given information store. For example, just after each snapshot or backup is performed, the data protection agent 95 may convert the metadata describing the resultant into a universal data format. This conversion allows the data protection agent, for example, to provide a universal restore interface for accessing the results of all copy operations.

Taking the example of a snapshot, the metadata generated by taking a snapshot may be converted into a normalized metadata format. Similarly, metadata generated by creating a backup copy of data may also be converted into a normalized metadata format. Thus, because the system stores metadata describing the disparate copy operations, comparisons may be made between the metadata to derive conclusions regarding the relationships of the underlying data, e.g., what volume the underlying data came from.

Figure 8:
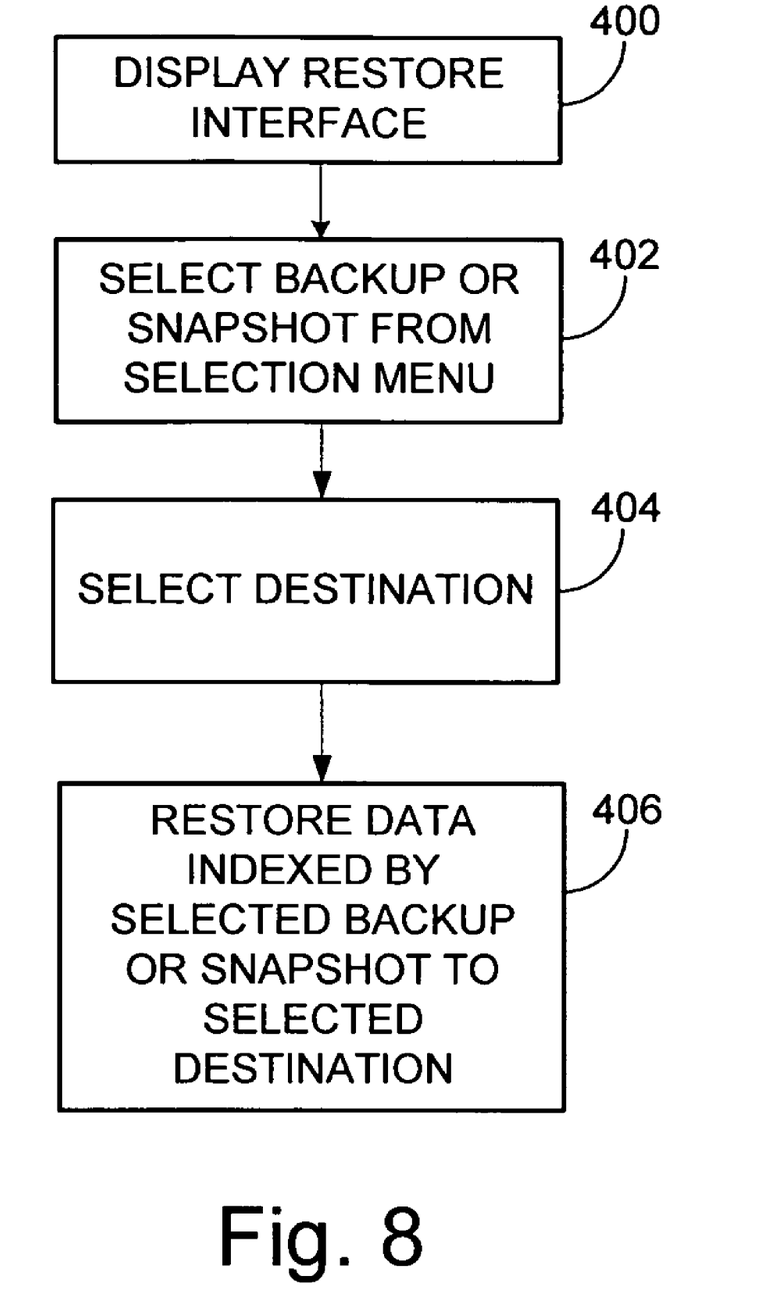
FIG. 8 is a flow diagram illustrating a method for restoring a copied data that utilized normalized metadata according to one embodiment of the present invention.

FIG. 8 presents a flow diagram illustrating one embodiments of a method for restoring a copied data that uses normalized metadata. If the user or administrator wants to restore data to an information store, a restore option interface is provided through the data protection agent, step 400. Because the result of each copy operation, backup, snapshot, etc, is described by normalized metadata, the disparate types of data described by the metadata may be accessed through the interface. Thus, a user may select to restore or other wise access data created by the disparate copy operations. The data protection agent presents a selection screen for browsing by the administrator, step 402.

After selecting the desired copy, the data protection agent allows the administrator to chose a restore destination (host information store and volume) to which the copy is restored, defaulting to the original target volume and host from which the copied was taken, step 404. An option to replace the whole volume, or to just copy the contents of the volume to a folder in the restore destination volume is provided. Once the restore destination is selected, the data protection agent instructs the media agent to restore the selected copy from the storage device to the restore destination.

If the administrator needs to restore files from a snapshot, one embodiment of the restore process is described in application Ser. No. 60/519,576 entitled "SYSTEM AND METHOD FOR PERFORMING AN IMAGE LEVEL SNAPSHOT AND FOR RESTORING PARTIAL VOLUME DATA," filed Nov. 13, 2003, which is hereby incorporated by reference in its entirety.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing integrated storage operations on an information store, the method comprising:
   initiating a first type of storage operation to be performed on an information store, wherein initiating the first type of storage operation includes selecting the first type of storage operation based on a first set of storage preferences;
   performing the first type of storage operation on the information store, wherein performing the first type of storage operation includes copying at least a first portion of the information store to one or more storage devices and generating first metadata which describes at least the copied first portion stored on the one or more storage devices, wherein the first metadata has a first format associated with the first type of storage operation;
   initiating a second type of storage operation disparate from the first of storage operation to be performed on the information store, wherein initiating the second type of storage operation includes selecting the second type of storage operation based on a second set of storage preferences, wherein the second type of storage operation differs from the first type of storage operation; and
   performing the second type of storage operation on the information store, wherein performing the second type of storage operation includes copying at least a second portion of the information store to one or more storage devices and generating second metadata which describes at least the copied second portion stored on the one or more storage devices, wherein the second metadata has a second format associated with the second type of storage operation, and wherein the second format of metadata is different from the first format of metadata;
   wherein the first type of storage operation and the second type of storage operation are performed by one or more data agents that converts the first metadata having a first format associated with the first type of storage operation and the second metadata having a second format associated with the second of storage operation into a normalized metadata format.

2. The method of claim 1, wherein the method includes identifying a plurality of disparate types of storage operations stored in a policy option table, wherein each type of storage operation copies at least a portion of the information store to one or more storage devices.

3. The method of claim 1, wherein the first type of storage operation is one of a full copy, snapshot, and serverless copy, and
   wherein the second type of storage operation is a different one of a full copy, snapshot or serverless copy.

4. A system for performing disparate types of storage operations on an information store, the system comprising:
   an information store for storing data;
   one or more data agents for performing disparate storage operations on the information store in conjunction with one or more media agents; and
   one or more storage devices;
   wherein the one or more data agents are configured to carry out, in conjunction with one or more media agents:

initiating a first type of storage operation to be performed on the information store, wherein initiating the first type of storage operation includes selecting the first type of storage operation based on a first set of storage preferences;

performing the first type of storage operation on the information store, wherein performing the first type of storage operation includes copying at least a first portion of the information store to one or more storage devices and generating first metadata which describes at least the copied first portion stored on the one or more storage devices, wherein the first metadata has a first format associated with the first type of storage operation;

initiating a second type of storage operation disparate from the first type of storage operation to be performed on the information store, wherein initiating the second type of storage operation includes selecting the second type of storage operation based on a second set of storage preferences; and performing the second type of storage operation on the information store, wherein performing the second type of storage operation includes copying at least a second portion of the information store to one or more storage devices and generating second metadata which describes at least the copied second portion stored on the one or more storage devices, wherein the second metadata has a second format associated with the second type of storage operation, wherein the second format of metadata is different from the first format; and, converting the first metadata having a first format associated with the first type of storage operation and the second metadata having a second format associated with the second type of storage operation into a normalized metadata format.

5. The system of claim 4, further comprising:

a restoration component, wherein the restoration component is configured to identify data to be restored within at least the copied first and second portions of the data store based on a review of the metadata in the normalized metadata format.

6. The system of claim 4, wherein a single data agent in communication with the information store is configured to carry out the initiating and performing of the first storage operation, the initiating and performing of the second storage operation, and the converting of the first metadata and second metadata into a normalized metadata format.

7. The system of claim 4, wherein a first data agent is configured carry out the initiating and performing of the first storage operation, a second data agent is configured to carry out the initiating and performing of the second storage operation, and a third data agent, in communication with the first data agent and the second data agent, is configured to carry out the converting of the first metadata and the second metadata into a normalized metadata format.

8. A method of copying at least a portion of an information store, the method comprising:

performing a first type of storage operation to copy at least a first portion of an information store to one or more storage devices;

generating first metadata which describes at least the copied first portion stored on the one or more storage devices, wherein the first metadata has a first format associated with the first type of storage operation;

performing a second type of storage operation, disparate from the first type of storage operation, to copy at least a second portion of the information store to one or more storage devices;

generating second metadata which describes at least the copied second portion stored on the one or more storage devices, wherein the second metadata has a second format associated with the second type of storage operation, wherein the second format is incompatible with the first format; and converting the first metadata having a first format associated with the first type of storage operation and the second metadata having the second format associated with the second type of storage operation into a normalized metadata format.

9. The method of claim 8, further comprising:

receiving a request to restore a portion of the information store; and utilizing the normalized metadata to restore the requested portion of the information store from the one or more storage devices.

10. The method of claim 8, further comprising:

receiving a request to restore a single file from the information store;

utilizing the normalized metadata to restore the requested single file the information store from the one or more storage devices.

11. The method of claim 8, wherein the first type of storage operation and the second type of storage operation are selected after reviewing a policy option table.

12. The method of claim 1 wherein the first metadata includes the location of at least the copied first portion on the one or more storage devices and the second metadata includes the location of at least the copied second portion stored on the one or more storage devices.

13. The method of claim 1 wherein the first type of storage operation is a full copy operation and the second type of storage operation is a snapshot operation.

* * * * *

UNITED STATES PATENT AND TRADEMARK OFFICE
CERTIFICATE OF CORRECTION

| | | |
|---|---|---|
| PATENT NO. | : 7,734,578 B2 | Page 1 of 1 |
| APPLICATION NO. | : 10/989893 | |
| DATED | : June 8, 2010 | |
| INVENTOR(S) | : Anand Prahlad et al. | |

It is certified that error appears in the above-identified patent and that said Letters Patent is hereby corrected as shown below:

In the Drawing,
On Sheet 3 of 8, in Fig. 3, Box No. 702, line 2, delete "Sanpshot" and insert -- Snapshot --, therefor.

In column 4, line 16, delete "difficulty" and insert -- difficultly --, therefor.

In column 7, line 1, delete "QuNetix" and insert -- QiNetix --, therefor.

In column 7, line 67, delete "culster(s)," and insert -- cluster(s), --, therefor.

In column 14, line 26, in claim 1, delete "of" and insert -- type of --, therefor.

In column 14, line 44, in claim 1, delete "converts" and insert -- convert --, therefor.

In column 14, line 47, in claim 1, delete "of" and insert -- type of --, therefor.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,734,578 B2 | Page 1 of 1 |
| APPLICATION NO. | : 10/989893 | |
| DATED | : June 8, 2010 | |
| INVENTOR(S) | : Anand Prahlad et al. | |

It is certified that error appears in the above-identified patent and that said Letters Patent is hereby corrected as shown below:

On the Title page, in Field (73), delete "Comm Vault" and insert -- CommVault --, therefor.

Signed and Sealed this
Twelfth Day of July, 2011

David J. Kappos
*Director of the United States Patent and Trademark Office*